US007174169B2

United States Patent
Iwamura et al.

(10) Patent No.: US 7,174,169 B2
(45) Date of Patent: Feb. 6, 2007

(54) DESIGN SUPPORT SYSTEM, DESIGN SUPPORT METHOD, AND COMPUTER READABLE RECORD MEDIUM ON WHICH PROGRAM FOR USE IN THOSE SYSTEM AND METHOD IS RECORDED

(75) Inventors: Mikio Iwamura, Tokyo (JP); Yoshihiro Ishikawa, Yokosuka-shi (JP)

(73) Assignee: NTT DoCoMo, Inc., Tokyo (JP)

( * ) Notice: Subject to any disclaimer, the term of this patent is extended or adjusted under 35 U.S.C. 154(b) by 243 days.

(21) Appl. No.: 10/263,841

(22) Filed: Oct. 4, 2002

(65) Prior Publication Data

US 2003/0068973 A1 Apr. 10, 2003

(30) Foreign Application Priority Data

Oct. 5, 2001 (JP) .......................... P2001-309896

(51) Int. Cl.
*H04Q 7/20* (2006.01)
(52) U.S. Cl. .................. 455/446; 455/67.11; 703/13; 703/22
(58) Field of Classification Search .. 455/67.11–67.14, 455/69, 70, 522, 446–449, 67.16, 67.15, 455/67.17, 423–424; 703/13, 14, 22
See application file for complete search history.

(56) References Cited

U.S. PATENT DOCUMENTS 5,561,841 A * 10/1996 Markus ...................... 455/446
6,199,032 B1    3/2001 Anderson
6,487,414 B1 * 11/2002 Tanay et al. ................ 455/446

FOREIGN PATENT DOCUMENTS

| CN | 1170553 | 1/1998 |
| JP | 9-245076 | 9/1997 |
| JP | 2001-094502 | 4/2001 |
| WO | WO 00/74401 | 12/2000 |

OTHER PUBLICATIONS

X. Huang, et al., Broadband Communications, pp. 301-306, XP-010376473, "A New Approach to Automatic Base Station Placement in Mobile Network", Feb. 15, 2000.

* cited by examiner

*Primary Examiner*—Charles Appiah
*Assistant Examiner*—Oliva Marsh
(74) *Attorney, Agent, or Firm*—Oblon, Spivak, McClelland, Maier & Neustadt, P.C.

(57) ABSTRACT

The present invention facilitates optimization of design values of system parameters in designing mobile communication system facilities. The present invention includes a criteria memory storing thresholds of a plurality of system parameters regarding designing of mobile communication facilities, a system parameter calculator for obtaining design values of the system parameters, a determiner for determining evaluation indicators of the system parameters by comparison between the design values and the thresholds, an advice table memory storing advice information corresponding to a combination of the evaluation indicators of the system parameters, a reader for searching the advice table memory and reading the advice information corresponding to the combination, and an output for outputting the read advice information.

6 Claims, 7 Drawing Sheets

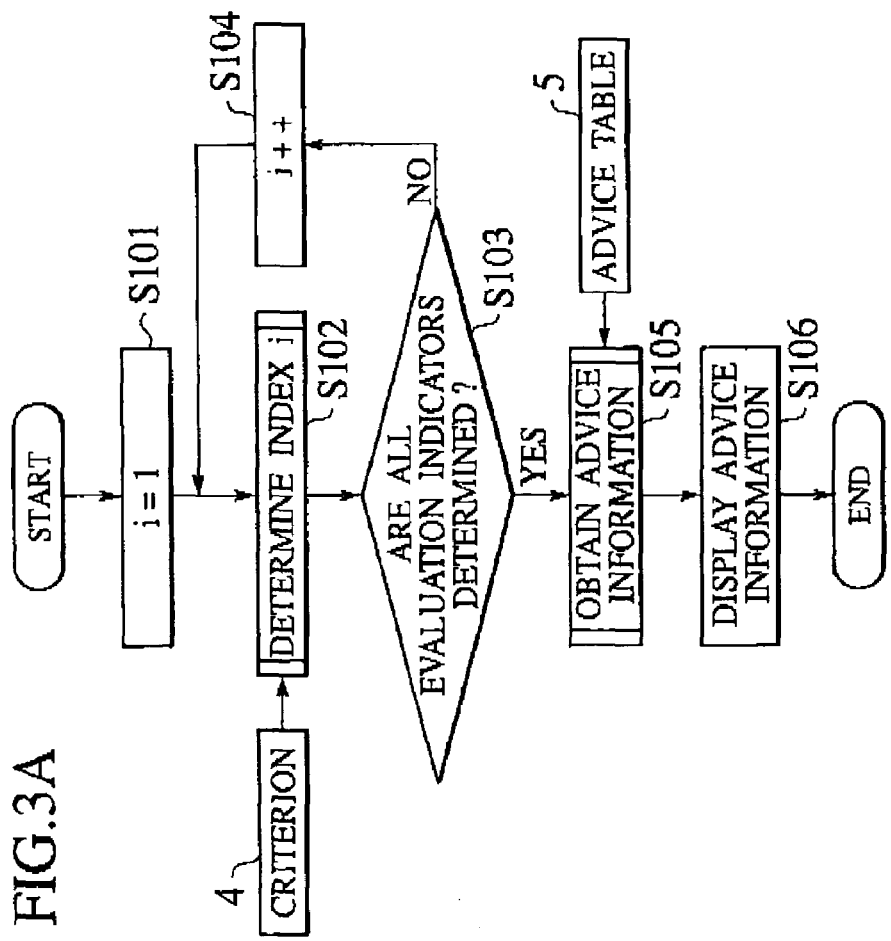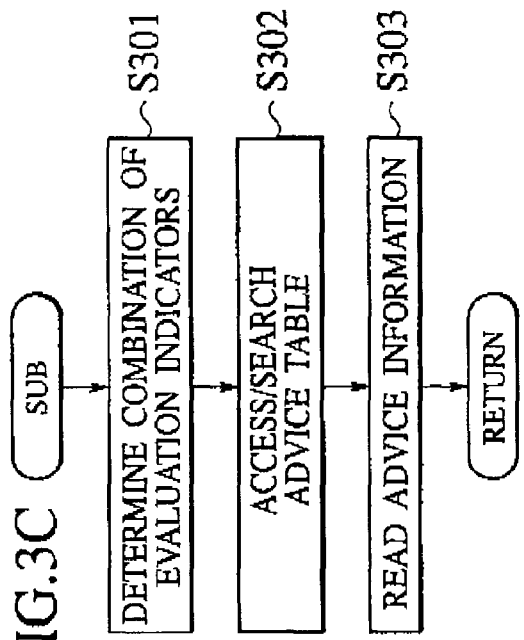

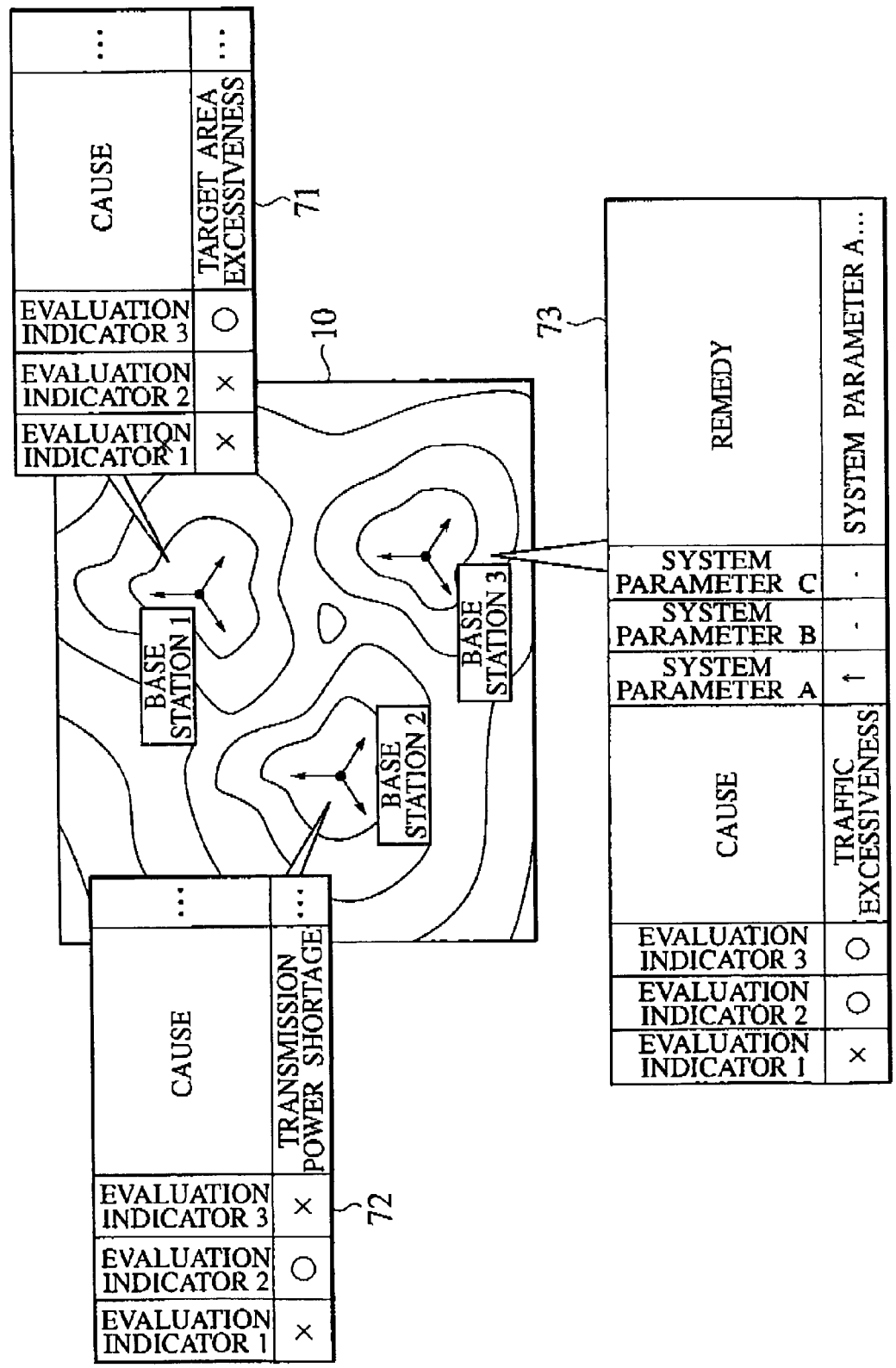

DESIGN SUPPORT SYSTEM, DESIGN SUPPORT METHOD, AND COMPUTER READABLE RECORD MEDIUM ON WHICH PROGRAM FOR USE IN THOSE SYSTEM AND METHOD IS RECORDED

CROSS REFERENCE TO RELATED APPLICATION

This application is based upon and claims the benefit of priority from the prior Japanese Patent Application No. P2001-309896, filed on Oct. 5, 2001; the entire contents of which are incorporated herein by reference.

BACKGROUND OF THE INVENTION

1. Field of the Invention

The present invention relates to a design support system, a design support method and a computer readable record medium on which a program for use in those system and method is recorded, for supporting designing of facilities such as base stations in mobile communication systems such as cellular communication systems.

2. Description of the Related Art

A mobile communication system such as a cellular communication system comprises a plurality of base stations disposed within service areas and a plurality of mobile stations to communicate with the base stations. In such a mobile communication system, the number of mobile stations which allows simultaneous communications without causing deterioration of communications quality, that is, traffic capacity, largely depends on radio wave propagation environment, transmission power of base stations, interference from other mobile stations in simultaneous communications, and so on.

Improper design of mobile communication system facilities would not only cause inefficiency in the mobile communication system, but also cause such problems as to prevent provision of desired service areas and a desired traffic capacity.

A mobile communication system constructed on the basis of improper design of mobile communication system facilities disadvantageously provides deteriorated service quality, such as causing forced disconnection during communications.

For these reasons, it is important to optimize the locations of base stations and system parameters regarding transmission power and the like by, for example, increasing transmission power to an extent not causing interference between mobile stations so as to configure an efficient mobile communication system with a smaller number of base stations and increased traffic capacities in all service areas.

However, the optimization of locations of base stations and system parameters as described above is not easy because of complicated effects of many factors such as radio wave propagation, interference between mobile stations and traffic characteristics.

In order to solve those problems, a design support tool (such as software or a device) for estimating propagation environment, communications quality and the like is used for supporting designing of mobile communication system facilities. Such a design support tool estimates a propagation loss in radio wave propagation, the amount of interference between mobile stations, a signal-to-interference ratio (SIR), and the like by computing. A designer for mobile communication system facilities can input the locations of base stations and system parameters into the tool, performing computation required for the designing of the mobile communication system facilities, and thereby obtaining evaluation results.

A design support tool for processing measured data has been conventionally used for the support of designing of mobile communication system facilities and service quality management in mobile communication systems. Such a design support tool can process real-world measurement results such as an electric field intensity, the amount of interference and an SIR by computer, map the measured values on a map, and provide statistics.

A designer, using the design support tool, views estimation results such as a propagation loss and an SIR or computational results, and adjusts system parameters by his own judgment, repeating evaluations on the design result of the mobile communication system facilities, and thereby optimizing the design of the mobile communication system facilities.

However, this optimization of mobile communication system facilities using the conventional design support tool requires consideration given to many factors such as a propagation loss, the amount of interference between mobile stations, an SIR, traffic characteristics and geographical distribution during the adjustment of system parameters.

The optimization involves, in addition to the locations of base stations, a number of system parameters such as antenna directivity, transmission power of each radio channel and hand over thresholds. The optimization of a number of system parameters by a designer's judgment involving simultaneous analysis of various estimation results thus requires cut-and-try complicated work, requiring much effort and high degree of experience of an operator.

BRIEF SUMMARY OF THE INVENTION

It is thus an object of the present invention to provide a design support system, a design support method and a computer readable record medium on which a design program which can facilitate the optimization of designing of mobile communication system facilities is recorded.

According to a first aspect of the present invention, there is provided a design support system which comprises: a criteria memory storing thresholds of a plurality of system parameters regarding designing of mobile communication facilities; a system parameter calculator configured to obtain design values of the system parameters; a determiner configured to determine evaluation indicators of the system parameters by comparison between the design values and the thresholds; an advice table memory storing advice information corresponding to a combination of the evaluation indicators of the system parameters; a reader configured to search the advice table memory and read the advice information corresponding to the combination; and an output configured to output the read advice information.

In this aspect, the mobile communication system facilities are base stations for mobile communications; the system parameters are set values regarding cells or sectors of the base stations; and the output preferably displays the read advice information for each cell or sector.

In this aspect, the advice information preferably includes an increase/decrease instruction on each of the design values.

According to a second aspect of the present invention, there is provided a design support method which comprises the steps of: a) obtaining design values of a plurality of system parameters regarding designing of mobile communication system facilities; b) reading thresholds of the respective system parameters; c) determining evaluation indicators of the respective system parameters by comparison between the design values and the thresholds; d) searching a data storage storing advice information corresponding to a combination of the evaluation indicators of the respective system parameters, and reading the advice information corresponding to the combination; and e) outputting the read advice information.

In this aspect, the mobile communication system facilities are base stations for mobile communications; the system parameters are set values regarding cells or sectors of the base stations; and at step e), the read advice information is preferably displayed for each cell or sector.

In this aspect, the advice information preferably includes an increase/decrease instruction on each of the design values.

According to a third aspect of the present invention, there is provided a computer readable record medium on which a program for directing a computer to perform processing is recorded, which processing comprises the steps of: a) obtaining design values of a plurality of system parameters regarding designing of mobile communication system facilities; b) reading thresholds of the respective system parameters; c) determining evaluation indicators of the respective system parameters by comparison between the design values and the thresholds; d) searching a data storage storing advice information corresponding to a combination of the evaluation indicators of the system parameters, and reading the advice information corresponding to the combination; and e) outputting the read advice information.

In this aspect, the mobile communication system facilities are base stations for mobile communications; the system parameters are set values regarding cells or sectors of the base stations; and at step e), the read advice information is preferably displayed for each cell or sector.

In this aspect, the advice information preferably includes an increase/decrease instruction on each of the design values.

BRIEF DESCRIPTION OF THE SEVERAL VIEWS OF THE DRAWINGS

FIGS. 3A to 3C are flow diagrams illustrating the operation of the design support system according to the embodiment;

FIG. 4 is an explanatory view of a screen displayed by the design support system according to the embodiment of the present invention;

DETAILED DESCRIPTION OF THE INVENTION

[Design Support Method Using Design Support System in an Embodiment of the Invention]

Figure 1A:
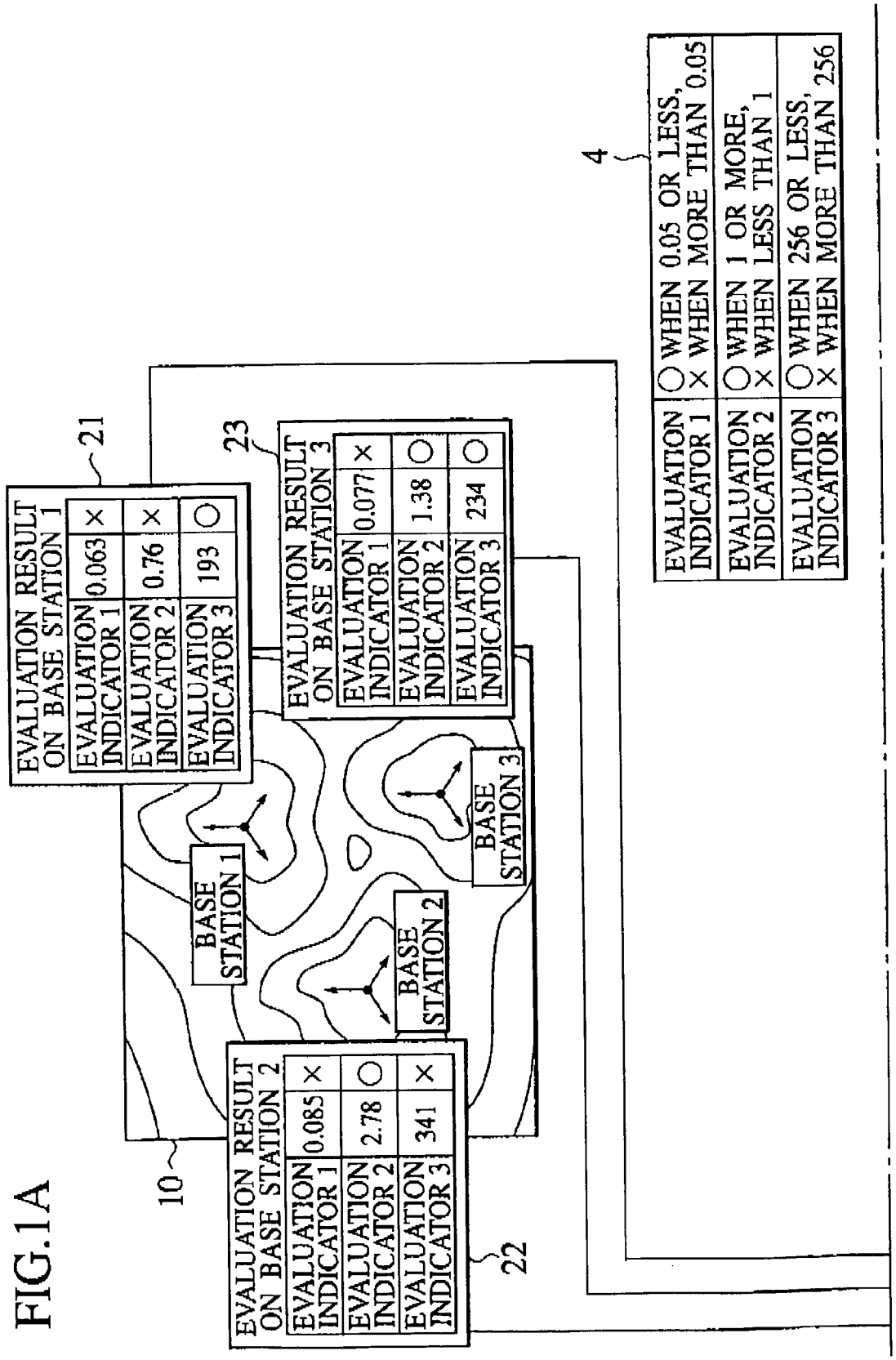
FIG. 1A is a map illustrating the locations of base stations and a table illustrating criterion in a design support system according to an embodiment of the present invention.
Figure 1B:
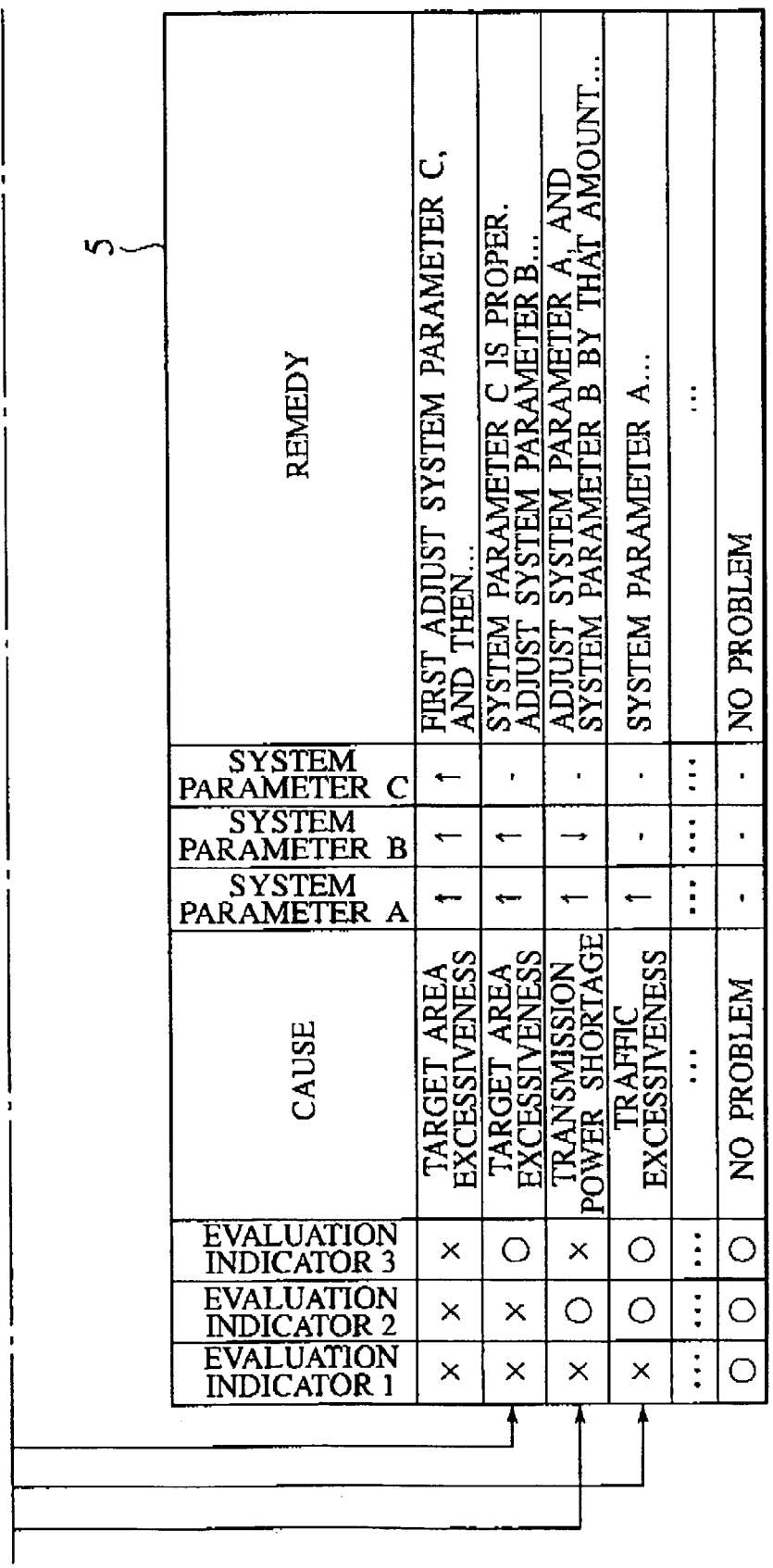
FIG. 1B is an advice table illustrating advice information in the design support system according to the embodiment of the present invention.

With reference to the accompanying drawings, a design support method using a design support system according to an embodiment of the present invention will be described in detail below. FIGS. 1A to 1B are explanatory views illustrating the steps of the design support method using the design support system according to this embodiment.

The design support method of this embodiment uses a criteria table 4, an advice table 5 and a map 10 to support designing of facilities in a mobile communication system such as a W-CDMA system, that is, designing of cells or sectors, for example.

The criteria table 4 provides criterion predetermined for obtaining evaluation indicators of system parameters of base stations 1 to 3.

The criteria table 4 illustrates, as shown in FIG. 1, criterion used for obtaining evaluation indicators based on comparisons (e.g., differences in value) between predetermined thresholds and given design values (e.g., estimated values or measured values as described above) for different system parameters.

The "system parameters" herein used include the location of a base station (location information), a propagation loss, a received power, a transmission power, an SIR, a call loss probability, a degradation ratio and a throughput.

The "thresholds" include numeric values and numerical ranges serving as criterion for obtaining evaluation indicators and can be empirically set for optimization of system parameters. In FIG. 1A, the threshold of evaluation indicator 1 is "0.05," the threshold of evaluation indicator 2 is "1," and the threshold of evaluation indicator 3 is "256."

The "design values" are arbitrary set for system parameters A to C of each of the base stations 1 to 3. The "design values" may be estimated values obtained by simulation processing or the like, or may be measured values on-site measured as samples.

The "evaluation indicators" are based on comparisons between the "design values" and the "thresholds" (e.g., their differences in value, distributions and rates of deviation), indicating evaluations on system parameters by binary values such as "○" and "X." The "evaluation indicators" maybe values of 3 or more levels.

In the present embodiment, evaluation indicator 1 is for system parameter A, evaluation indicator 2 is for system parameter B and evaluation indicator 3 is for system parameter C.

In FIG. 1A, criterion are set such that "evaluation indicator 1 is ○ when system parameter A is 0.05 or less, and evaluation indicator 1 is X when system parameter A is more than 0.05," "evaluation indicator 2 is ○ when system parameter B is 1 or more, and evaluation indicator 2 is X when system parameter B is less than 1." and "evaluation indicator 3 is ○ when system parameter C is 256 or less, and evaluation indicator 3 is X when system parameter C is more than 256."

The advice table 5 stores in advance advice information pieces corresponding to combinations of evaluation indicators 1 to 3 of different system parameters.

The "advice information" herein used indicates how the design of mobile communication system facilities should be changed in order for all evaluation indicators to satisfy criterion. The "advice information" notifies the reason why system parameters A to C do not satisfy criterion and remedies such as what changes should be done for system parameters A to C to satisfy criterion.

In the present embodiment, the causes of inclusion of X in evaluation indicators (such as "target area excessiveness." "transmission power shortage," and "traffic excessiveness"), up-arrows and down-arrows instructing increase and decrease of system parameters, and remedies (such as "First adjust system parameter C and then . . . ," "System parameter C is proper. Adjust system parameter B . . . ") are written as the "advice information" for combination patterns of evaluation indicators 1 to 3.

The increase and decrease instructions on system parameters indicate which system parameter's setting should be changed to what extent so that design values of the system parameters satisfy criterion. The instructions include such ones as indicating priority change of system parameters having high degrees of effects, instructing priority change of system parameters having strong interconnections with other parameters, and indicating system parameters without need to change.

The map 10 illustrates propagation loss, estimation of communications quality or distribution of communications quality upon input of given design values for the base stations 1 to 3. More specifically, the map 10 represents, in contour as shown in FIG. 1, propagation loss and distribution of communications quality estimated based on geographical conditions and effects of buildings around the base stations 1 to 3, upon providing design values of system parameters such as the locations of the base stations 1 to 3 and transmission powers. Propagation loss and distribution of communications quality of the map 10 may be provided based on on-site measured values.

The map 10 shows evaluation indicators 1 to 3 on system parameters A to C of each of the base stations 1 to 3. In FIG. 1, the map 10 shows evaluation result 21 on the base station 1, evaluation result 22 on the base station 2, and evaluation result 23 on the base station 3. In the evaluation results 21 to 23 on the base stations 1 to 3 on the map 10, system parameters A to C of the base stations 1 to 3 with the evaluation indicators of "○" satisfy the criterion, and system parameters A to C of the base stations 1 to 3 with the evaluation indicators of "X" do not satisfy the criterion.

In the design support method of the present embodiment, first, a designer provides design values on system parameters A to C for each of the base stations 1 to 3. Second, the design support system of this embodiment compares the design values (corresponding to system parameters A to C) with the respective thresholds as criterion, determining evaluation indicators 1 to 3 from the comparisons. Third, the design support system of this embodiment obtains a combination pattern of evaluation indicators 1 to 3 for each of the base stations 1 to 3, accesses the advice tables 5 for the pattern, and searches advice information.

Figure 2:
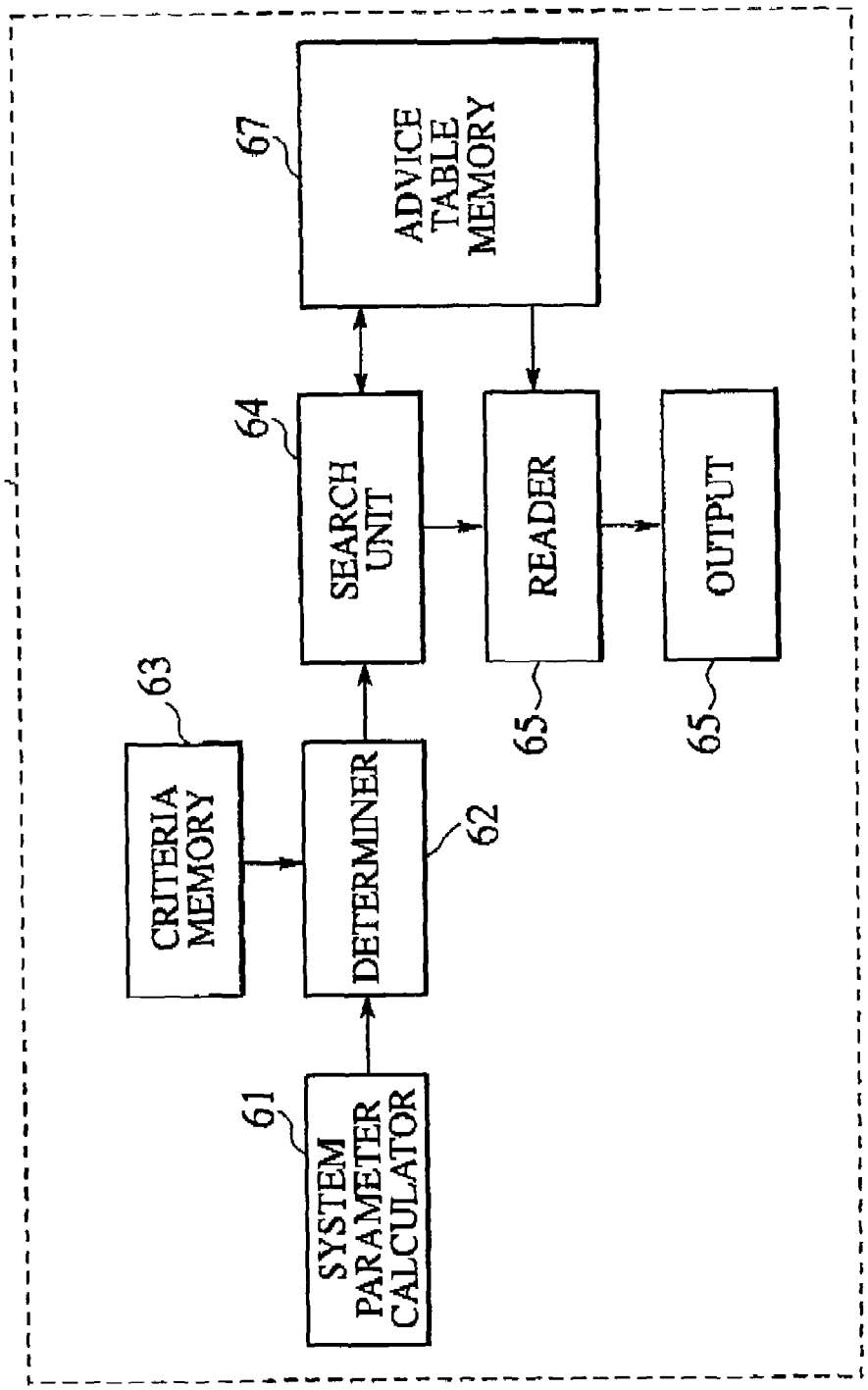
FIG. 2 is a block diagram illustrating the general configuration of the design support system according to the embodiment of the present invention.

The design support system used in the above-described design support method will be described. FIG. 2 is a block diagram illustrating the inside configuration of a design support system 6 according to the present invention.

As shown in FIG. 2, the design support system 6 includes a system parameter calculator 61, a determiner 62, a criteria memory 63, a search unit 64, a reader 65, an output 66 and an advice table memory 67.

The system parameter calculator 61 obtains design values of a plurality of system parameters regarding design of cells or sectors. The system parameter calculator 61 produces design values of system parameters to be compared with thresholds as criterion. The design values may be estimated values, measured values or any values set by a designer. The system parameter calculator 61 transmits calculated design values to the determiner 62.

The criteria memory 63 constitutes a data memory for storing thresholds of system parameters regarding design of cells or sectors. The criteria memory 63 is a storage device such as a memory or a hard disk. The criteria memory 63 stores criterion including thresholds of evaluation indicators 1 to 3, as the criteria table 4. The criteria memory 63 transmits criterion of evaluation indicators 1 to 3 to the determiner 62 as requested by the determiner 62.

The determiner 62 determines evaluation indicators upon comparison between design values and thresholds for different system parameters. More specifically, the determiner 62 determines the difference in value between design values and thresholds, outputs "○" as evaluation indicators when design values satisfy criterion, and outputs "X" as evaluation indicators when design values do not satisfy criterion. The determiner 62 supplies evaluation indicator output to the search unit 64.

The advice table memory 67 stores the advice table 5 storing advice information corresponding to combinations of evaluation indicators of different system parameters. The advice table memory 67 may be in the form of a storage device such as a memory or a hard disk.

In the present embodiment, data pieces within the advice table 5 are given addresses for each combination pattern of evaluation indicators and for each item such as a "cause" or "remedy." The advice table memory 67 outputs information corresponding to an address specified.

The search unit 64 is an interface with the advice table memory 67, for searching the advice table memory 67. More specifically, the search unit 64 determines a combination pattern of evaluation indicators 1 to 3 on each of the base stations 1 to 3 received from the determiner 62, and extracts advice information corresponding to the combination pattern from the advice table memory 67. In the present embodiment, the search unit 64 obtains addresses on the advice table memory 67 and transmits the advice information to the reader 65.

The reader 65 is an interface with the advice table memory 67 and obtains the corresponding advice information from the advice table memory 67 based on the address information received from the search unit 64. The reader 65 transmits the advice information to the output 66.

The output 66 outputs the advice information received from the reader 65 as image data to be displayed on the map 10. The output 66 is, for example, a display device for displaying images and characters, a printer, or a data communication device such as a LAN card, for providing data via images or a medium.

[Operation of Design Support System and Method in the Embodiment]

The operation of the design support system 6 of such a configuration will be described below. FIGS. 3A to 3C are flow diagrams illustrating the operation of the design support system 6. In FIGS. 3A to 3C, the operation for each of the base stations 1 to 3 will be exemplarily described.

As shown in FIG. 3A, at step 101, the design support system 6, upon start of operation, initializes index "i" for counting evaluation indicators to "1."

At step 102, the design support system 6 determines, sequentially from evaluation indicator 1, evaluation indicators 1 to 3 of design values of system parameters of each of the base stations 1 to 3. The operation at step 102 will be described in detail with reference to FIG. 3B.

As shown in FIG. 3B, at step 201, the determiner 62 obtains design values of system parameters produced at the system parameter calculator 61.

At step 202, the determiner 62 accesses the criteria table 4 stored in the criteria memory 63 for comparison between thresholds and the obtained design values.

At step 203, the determiner 62 determines binary evaluation indicators based on the comparison.

Then, the operation returns to FIG. 3A. At step 103, the design support system 6 determines whether or not all evaluation indicators 1 to 3 are determined. When all evaluation indicators 1 to 3 are determined, the operation proceeds to step 105, and "1" is added to index "i." The operation returns to step 102.

At step 105, the design support system 6 obtains advice information. The operation at step 105 will be described in detail with reference to FIG. 3C.

As shown in FIG. 3C, at step 301, the search unit 64 determines a combination of the evaluation indicators determined by the determiner 62 and obtains a combination pattern of the evaluation indicators.

At step 302, the search unit 64 accesses the advice table 5 stored in the advice table memory 67 for searching the corresponding evaluation indicator combination based on the determined combination pattern of the evaluation indicators.

At step 303, the reader 65 reads advice information corresponding to the evaluation indicator combination searched by the search unit 64, from the advice table memory 67.

Then, the operation returns to FIG. 3A. At step 106, the output 66 outputs the read advice information.

An exemplary display outputted by the output 66 is shown in FIG. 4. The output 66 arranges the base stations (cells) 1 to 3 on the map 10 and displays advice information pieces 71 to 73 read for the base stations 1 to 3.

[Function/Effect of Design Support System and Method in the Embodiment]

According to the design support method and the design support system according to the present embodiment, design values inputted by a designer is compared with preset thresholds to determine evaluation indicators of system parameters A to C, and the advice table data 5 is searched based on a combination of the evaluation indicators, so that the designer can obtain advice information about the effects of the individual design values on other system parameters.

Since the advice information is empirically predetermined, the designer can change the design values in accordance with the advice information, easily resetting the system parameters without complicated cut-and-try methods.

Further, the design support method and design support system of the present embodiment allow a person without good knowledge of the characteristics of the base stations 1 to 3 in designing cells or sectors, to perform designing based on the advice information, facilitating and expediting designing of cells or sectors.

Further, according to the design support method and the design support system of the present embodiment, the advice information notifies which one of system parameters A to C should be changed, so that the designer can speedily reset design values of the system parameters.

Further, the design support method and the design support system according to the present embodiment facilitate a designer's knowing problems of a mobile communication system without his own analysis of system parameters or evaluation results in a complicated relationship with one another.

Further, the design support method and the design support system according to the present embodiment allow a designer to immediately know a remedy for the design of mobile communication system facilities, lessening work in designing mobile communication system facilities and facilitating optimization of designing of mobile communication system facilities.

[Computer Readable Record Medium on which Design Support Program is Recorded]

The above-described design support method can be implemented by software constructed by a predetermined programming language. The above-described design support system can be implemented by running the software on a general-purpose computer such as a personal computer. That is, a design support program in the present embodiment is configured to perform the processing steps shown in FIG. 3 by use of hardware resources constituting a general-purpose computer.

More specifically, the design support program directs a computer to perform processing including the step a) of obtaining design values of a plurality of system parameters regarding the designing (designing of cells or sectors) of mobile communication system facilities, the step b) of reading thresholds of the system parameters, the step c) of determining evaluation indicators of the system parameters by comparison between the design values and the thresholds, the step d) of searching a data memory storing advice information corresponding to combinations of the evaluation indicators of the system parameters and reading the advice information corresponding to the combinations, and the step e) of outputting the read advice information.

Figure 5:
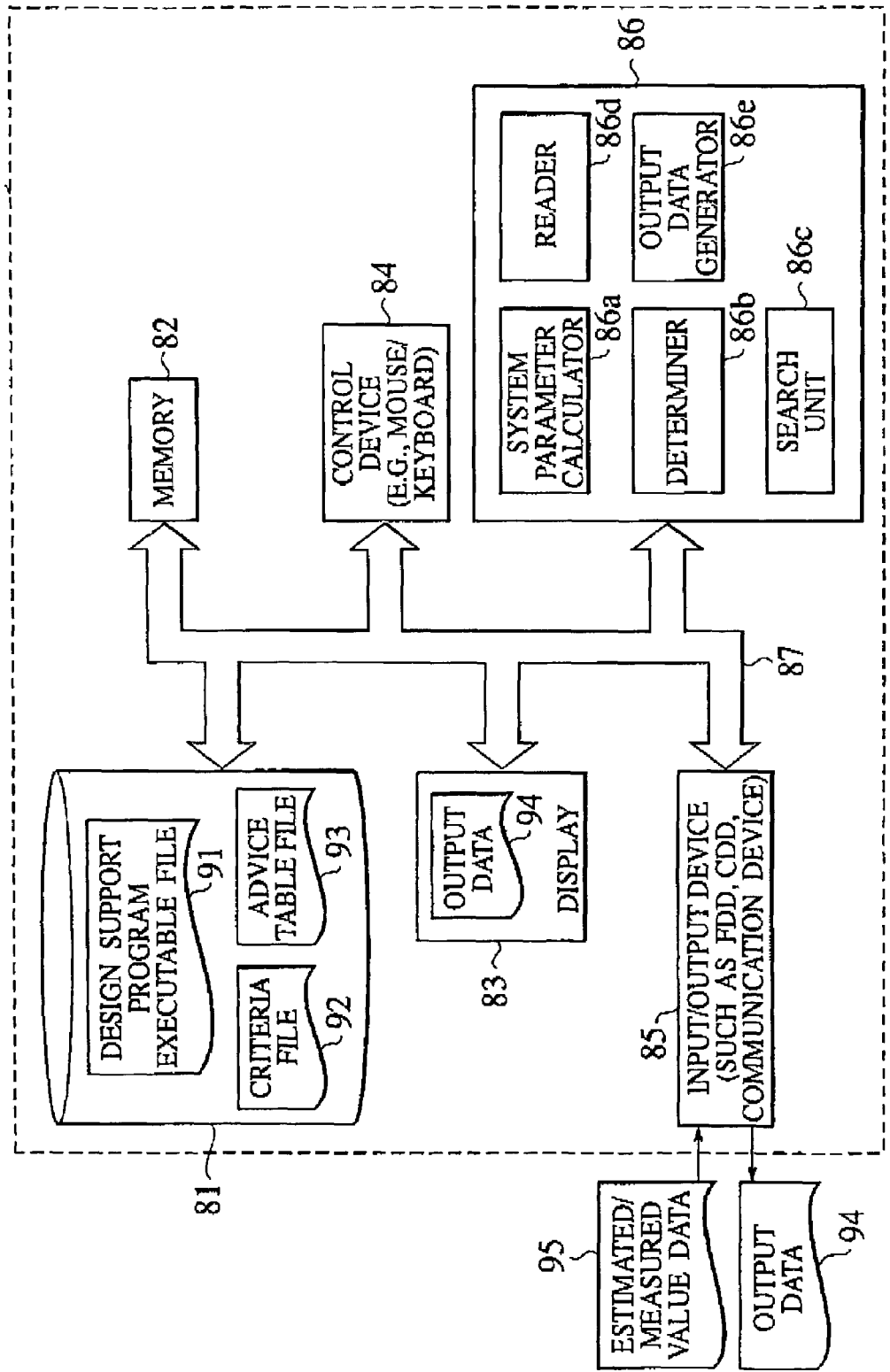
FIG. 5 is a block diagram illustrating the configuration of the design support system implemented by execution of a program according to the embodiment of the present invention.

The design support program containing the above steps a) to e) is stored in a hard disk provided to the computer as a design support program executable file, and read and executed on a CPU. FIG. 5 is a block diagram illustrating execution of the design support program on a general-purpose computer 115 such as a personal computer.

As shown in FIG. 5, the general-purpose computer 115 includes a hard disk 81 and a memory 82 as a storage device, a CPU 86 for various kinds of processing, a display 83 for displaying images and the like, an control device 84 such as a mouse and a keyboard, and an input/output device 85 inputting and outputting data to or from an external device or a medium.

The hard disk 81 functions both as the criteria memory 63 storing a criteria file 92 and as the advice table memory 67 storing an advice table file 93 (See FIG. 2). The hard disk 81 transmits required data in response to a request from the CPU 86, to the CPU 86 and the memory 82. The hard disk 81 stores a design support program executable file 91 and transmits the design support program executable file 91 to the CPU 86 in accordance with an executable instruction from the CPU 86.

The CPU 86 executes the design support program executable file 91, serving as a system parameter calculator 86a, a determiner 86b, a search unit 86c, a reader 86d and an output data generator 86e. The system parameter calculator 86a, the determiner 86b, the search unit 86c and the reader 86d are similar to the system parameter calculator 61, the determiner 62, the search unit 64 and the reader 65 as described above.

The output data generator 86e generates data for displaying advice resulting from processing by the CPU 86. In the present embodiment, the data is structured by images and character data for displaying the base stations 1 to 3 and advice information for the base stations 1 to 3. The output data is displayed on the display 83 or outputted to an external device or medium via the input/output device 85.

The input/output device 85 is a printer, a floppy disk drive (FDD), a CD-ROM drive (CDD) or the like for printing or writing data to a paper or a computer readable record medium, or a communication device such as a modem or a terminal adapter for transferring the output data via a communication line.

The input/output device 85 reads data required for processing by the CPU 86, that is, estimated/measured value data 95 recording estimated values or measured values, for example, and stores the read data in the hard disk 81 or the memory 82.

The design support system thus implemented by executing the design support program on the general-purpose computer 115 operates as described below.

First, the system parameter calculator 86a of the design support system generates design values on the base stations 1 to 3 regarding designing of cells or sectors, based on information inputted via the control device 84.

Second, the determiner 86b obtains the generated design values, accesses the criteria file 92 stored in the hard disk 81, thereby comparing the design values with the thresholds, and based on the comparison, determines binary evaluation indicators.

Third, upon determining all evaluation indicators, the design support system obtains advice information. More specifically, the search unit 86c determines a combination of the determined evaluation indicators, determines a pattern of the combination of the evaluation indicators, and based on the determined combination pattern of the evaluation indicators, accesses the advice table file 93 stored in the hard disk 81 for searching the corresponding combination of evaluation indicators.

Fourth, the reader 86d reads advice information corresponding to the combination of the evaluation indicators searched by the search unit 86c from the hard disk 81, and the output data generator 86e generates output data for transmission to the display 83 or the input/output device 85.

Based on the output data, the display 83 or the input/output device 85 shows the advice information for the base stations (cells or sectors) 1 to 3 as shown in FIG. 4, for example.

Figure 6:
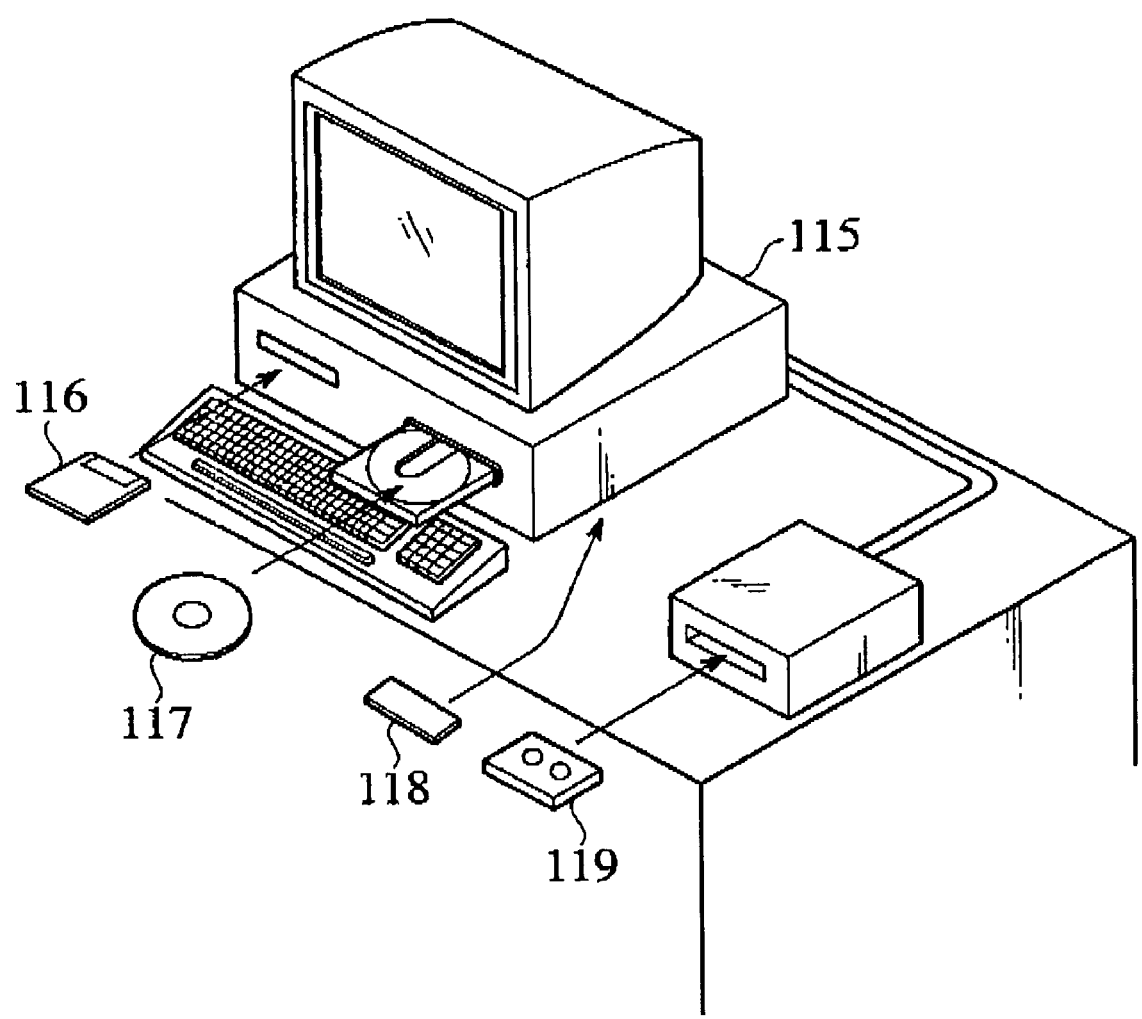
FIG. 6 is an external view of computer readable recording media on which the program according to the embodiment of the present invention is recorded.

The design support program executable file 91 can be recorded on computer readable record media as shown in FIG. 6. That is, as shown in FIG. 6, recording the design support program onto a floppy disk 116, a CD-ROM 117, a RAM 118, a cassette tape 119 and the like enables installing software in the computer 115 via these record media, facilitating the keeping, transportation and delivery of the design support program.

As described above, the present invention can access advice information provided in advance from a combination of evaluation results of a plurality of evaluation indicators to know problems and remedies in designing mobile communication system facilities, allowing a designer to immediately know problems and remedies of a mobile communication system without analyzing, by himself, system parameters and evaluation results complicatedly affecting one another.

Further, the present invention can lessen complicated work in designing mobile communication system facilities and facilitates the optimization in designing of mobile communication system facilities.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A design support system comprising:
    a criteria memory configured to store criterion including thresholds of a plurality of system parameters regarding designing of mobile communication facilities;
    a system parameter calculator configured to obtain design values of the system parameters;
    a determiner configured to determine evaluation indicators of the system parameters upon comparison between the design values and the thresholds of the system parameters by referring to the criterion, the evaluation indicators indicating evaluations of the system parameters;
    an advice table memory configured to store advice information corresponding to a combination of the evaluation indicators of said system parameters, the advice information including an increase/decrease instruction on at least one of the design values in order for the evaluation indicators to satisfy the criterion;
    a reader configured to search the advice table memory and read the advice information corresponding to the combination; and
    an output configured to output the read advice information.

2. The design support system as set forth in claim 1, wherein:
    the mobile communication system facilities are base stations for mobile communications;
    the system parameters are set values regarding cells or sectors of the base stations; and
    the output displays the read advice information for each cell or sector.

3. A design support method comprising:
    storing criterion including thresholds of a plurality of system parameters regarding designing of mobile communication facilities;
    obtaining design values of the system parameters;
    reading the thresholds of the respective system parameters;
    determining evaluation indicators of the respective system parameters upon comparison between the design values and the thresholds by referring to the criterion, the evaluation indicators indicating evaluations on the system parameters;
    searching a data storage storing advice information corresponding to a combination of the evaluation indicators of the respective system parameters, and reading the advice information corresponding to the combination, the advice information including an increase/decrease instruction on at least one of the design values in order for all evaluation indicators to satisfy the criterion; and
    outputting the read advice information.

4. The design support method as set forth in claim 3, wherein:
    the mobile communication system facilities are base stations for mobile communications;
    the system parameters are set values regarding cells or sectors of the base stations; and
    at the outputting step, the read advice information is displayed for each cell or sector.

5. A computer readable record medium on which a program for directing a computer to perform processing is recorded, the processing comprising:
- storing criterion including thresholds of a plurality of system parameters regarding designing of mobile communication facilities;
- obtaining design values of the system parameters;
- reading the thresholds of the respective system parameters;
- determining evaluation indicators of the respective system parameters upon comparison between the design values and the thresholds by referring to the criterion, the evaluation indicators indicating evaluations on the system parameters;
- searching a data storage storing advice information corresponding to a combination of the evaluation indicators of the respective system parameters, and reading the advice information corresponding to the combination the advice information including an increase/decrease instruction on at least one of the design values in order for the evaluation indicators to satisfy the criterion; and
- outputting the read advice information.

6. The computer readable record medium as set forth in claim 5, wherein:
- the mobile communication system facilities are base stations for mobile communications;
- the system parameters are set values regarding cells or sectors of the base stations; and
- at the outputting step, the read advice information is displayed for each cell or sector.

* * * * *